3,003,271
TOUR NAVIGATOR
Donald T. Purling, Hayward, Calif.
(% Clyde Ingrum, Rte. 5, Box 52, Clay Center, Kans.)
Filed Dec. 16, 1959, Ser. No. 860,043
1 Claim. (Cl. 40—86)

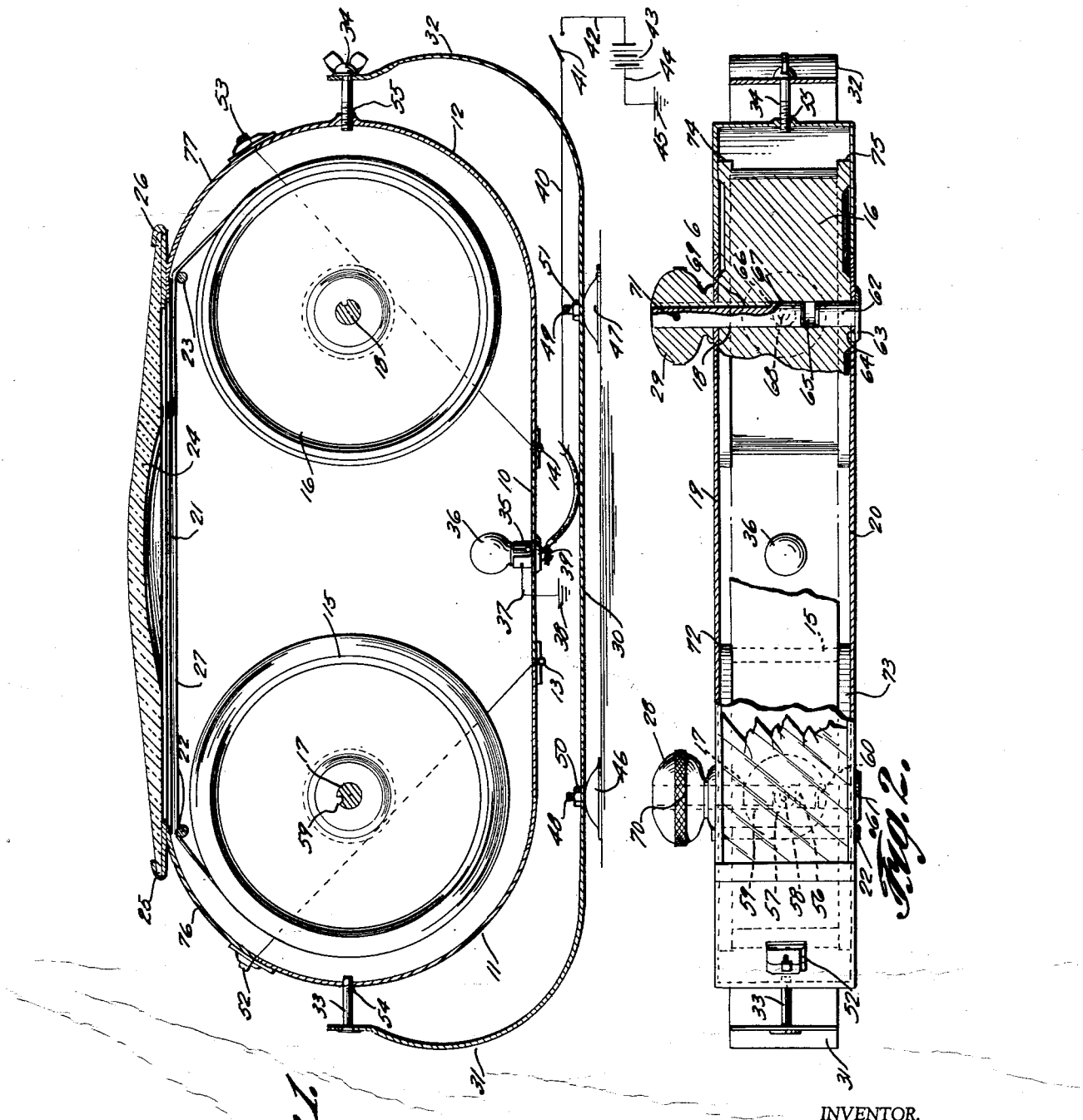

This invention relates to tape or strip maps for use in motor vehicles, and in particular a strip map carried on a pair of spools with the spools actuated by knobs extended from sides of a casing in which the spools are positioned and the map casing, which is suspended in a cradle retained by vacuum cups on the cowl of a vehicle, is provided with a magnifying lens to facilitate reading indicia on the map.

The purpose of this invention is to provide a small map assembly for use in a motor vehicle in which a route is readily followed by the operator of the vehicle.

Various types of tape maps have been provided for use in motor vehicles and although such devices have been installed in instrument panels and on steering wheel posts of vehicles it is difficult for an operator of a vehicle to follow a route without removing his eyes from the road. With this thought in mind this invention contemplates a strip map rolled on spools in a relatively small casing in which the map is magnified by a lens and in which the casing may readily be moved from one position to another.

The object of this invention is, therefore, to provide a holder for a strip map whereby the position of the holder may be adjusted to the convenience of the operator of the vehicle.

Another object of the invention is to provide a strip map holder in which a map therein may be moved forwardly or rearwardly.

Another important object of the invention is to provide a small casing for a strip map in which the map may readily be changed.

A further object of the invention is to provide a holder for a strip map in which the holder may be mounted in different positions upon the cowl of a vehicle in which the holder is of simple and economical construction.

With these and other objects and advantages in view the invention embodies an elongated casing having hinged doors at the ends with strip map carrying spools rotatably mounted therein and operated by knobs extended from one side, the casing being provided with a lens to facilitate reading the map, and the casing being suspended between ends of a cradle having vacuum cups for retaining the map in position extended therefrom.

Other features and advantages of the invention will appear from the following description taken in connection with the drawings, wherein:

FIGURE 1 is a longitudinal section through the tour map holder showing a strip of material wrapped on spools and extended below a magnifying lens in a small casing with the casing suspended between a pin and thumb screw of a supporting cradle.

FIGURE 2 is a plan view of the map holder with parts broken away and parts shown in section.

Referring now to the drawing wherein like reference characters denote corresponding parts the improved map holder of this invention includes a casing 10, end sections 11 and 12 connected to the casing 10 by hinges 13 and 14, respectively, spools 15 and 16 mounted on shafts 17 and 18, rotatably mounted in side walls 19 and 20 of the casing, a strip map 21 mounted on the spools and trained over pins 22 and 23 also extended between the side walls of the casing, a magnifying lens 24 mounted by clips 25 and 26 over an opening 27 in the upper part of the casing, knobs 28 and 29 positioned on extended ends of the shafts 17 and 18 for rotating the shafts to move the strip map 21 forwardly or rearwardly, and a cradle 30 having arcuate ends 31 and 32 with a pin 33 in the end 31 and a thumb screw 34 in the end 32.

The casing 10 is also provided with a light bulb socket 35 in which a light bulb 36 is positioned, and, as shown in FIGURE 1, one side of the socket 35 is grounded through a wire 37, that extends to a ground 38 and the opposite or center terminal 39 of the socket 35 is connected by a wire 40 to one terminal of a switch 41, the opposite side of which is connected by a wire 42 to one side of a battery 43, the opposite side of which is connected by a wire 44 to a ground 45. A button for actuating the switch 41 may be positioned at any suitable point on the casing.

The base of the cradle 30 is provided with vacuum cups 46 and 47, studs 48 and 49 of which are secured in the cradle by lock nuts 50 and 51.

The closures or end sections 11 and 12 are secured in closed positions by snap fasteners 52 and 53 and the closure 11 is provided with an opening 54 in which the pin 33 is positioned. The end section 12 is provided with a threaded opening 55 in which the thumb screw 34 is threaded, as shown in FIGURE 1.

The shaft 17 upon which the knob 28 is positioned is provided with a slot 56 in which a cam 57 is pivotally mounted by a pin 58 and the cam is positioned to extend into a slot 59 in the spool 15 whereby the cam provides a key causing the spool to rotate with the shaft. A stud 60 having a head 61 thereon is secured in the wall 20 and with the stud in alignment with the shaft 17 the spool 15 may be placed on the stud to align the spool with the opening through which the shaft 17 extends.

A similar stud 62 having a head 63 is mounted in an opening 64 in the side wall 20 and the stud 62 is positioned to extend into an opening 65 in the spool 16 whereby the spool 16 is located to receive the shaft 18, which is also provided with a slot 66, similar to the slot 56, and in which a cam 67 is mounted by a pin 68. The cam 67 extends into a slot 69 in the spool 16. The knobs 28 and 29 are secured on ends of the shafts 17 and 18 by pins 70 and 71.

The spool 15 is provided with flanges 72 and 73, and the spool 16 is provided with similar flanges 74 and 75.

The clips 25 and 26 are secured, such as by welding, to outer surfaces of end sections 76 and 77 of the casing and with the lens in position indicia on the map strip extended from the spools is readily understood by the operator of a vehicle.

With the parts assembled as illustrated and described the casing is arranged in any suitable position on the upper surface of the cowl or instrument panel and when in a convenient position for an operator of a vehicle the casing is pressed downwardly whereby the vacuum cups retain the casing in position.

The side wall may be folded downwardly to provide access to the interior of the casing to facilitate changing a tape or map strip.

The invention may be referred to as a Navi-Tour or other suitable trade name.

It will be understood that modifications, within the scope of the appended claim, may be made in the design and arrangement of the parts without departing from the spirit of the invention.

What is claimed is:

In a route map holder, the combination which comprises a relatively thin elongated casing, said casing having side and end walls, with a section of each end wall pivotally mounted for movement in relation to said side walls, means for retaining the sections in fixed relation to said side walls, a U-shaped cradle having upwardly extended arcuate shaped ends, a pin in one end of the cradle positioned to extend into an opening positioned in one section of the end walls of the casing, a thumb screw in the other section of the end walls of the opposite end of the cradle and threaded in said casing, and vacuum cups mounted on the cradle for retaining the casing on a surface in a motor vehicle.

References Cited in the file of this patent

UNITED STATES PATENTS

| | | |
|---|---|---|
| 1,312,445 | Johnson | Aug. 5, 1919 |
| 1,395,509 | Mason et al. | Nov. 1, 1921 |
| 2,209,990 | McCauley | Aug. 6, 1940 |
| 2,221,451 | Jones | Nov. 12, 1940 |
| 2,787,070 | Idoine | Apr. 2, 1957 |